US011101843B1

(12) United States Patent
Wild

(10) Patent No.: US 11,101,843 B1
(45) Date of Patent: Aug. 24, 2021

(54) SELECTIVE NARROWBAND INTERFERENCE CANCELLATION

(71) Applicant: Amazon Technologies, Inc., Seattle, WA (US)

(72) Inventor: Benjamin Wild, Marina Del Rey, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/804,808

(22) Filed: Feb. 28, 2020

(51) Int. Cl.
*H04B 1/71* (2011.01)
*H04B 1/69* (2011.01)

(52) U.S. Cl.
CPC ... *H04B 1/7102* (2013.01); *H04B 2001/6912* (2013.01)

(58) Field of Classification Search
CPC .......... H04B 1/7102; H04B 2001/6912; H04B 15/00; H04L 25/08
See application file for complete search history.

(56) References Cited

U.S. PATENT DOCUMENTS

| | | | | |
|---|---|---|---|---|
| 6,975,673 B1* | 12/2005 | Rouquette | ............ | H04B 1/7102 375/145 |
| 7,860,476 B1* | 12/2010 | Karr | ............... | H04B 1/1036 455/296 |
| 9,949,277 B1* | 4/2018 | Anand | ............... | H04J 11/0023 |
| 2002/0196876 A1* | 12/2002 | Takada | ............... | H04B 1/7101 375/346 |
| 2006/0229869 A1* | 10/2006 | Nemer | ............... | G10L 21/0208 704/226 |
| 2013/0028358 A1* | 1/2013 | Hou | ............... | H04B 1/10 375/350 |
| 2013/0083876 A1* | 4/2013 | Suzuki | ............... | H04B 1/1027 375/350 |
| 2013/0084810 A1* | 4/2013 | Matsubara | ............... | H04B 1/1036 455/73 |
| 2015/0030110 A1* | 1/2015 | Lo | ............... | H04B 1/10 375/350 |
| 2018/0013514 A1* | 1/2018 | Hudson | ............... | H04K 3/228 |
| 2018/0019774 A1* | 1/2018 | Hampel | ............... | H04L 25/0204 |
| 2018/0131403 A1* | 5/2018 | Dafesh | ............... | H04B 1/7107 |

\* cited by examiner

*Primary Examiner* — Freshteh N Aghdam
(74) *Attorney, Agent, or Firm* — Greenberg Traurig, LLP

(57) ABSTRACT

The present disclosure relates to selectively determining whether to attenuate frequencies in a received signal by converting the received signal into frequency-domain data, filtering frequency components that are likely to include an interference component, and calculating signal quality of the signal data before and after filtering.

20 Claims, 9 Drawing Sheets

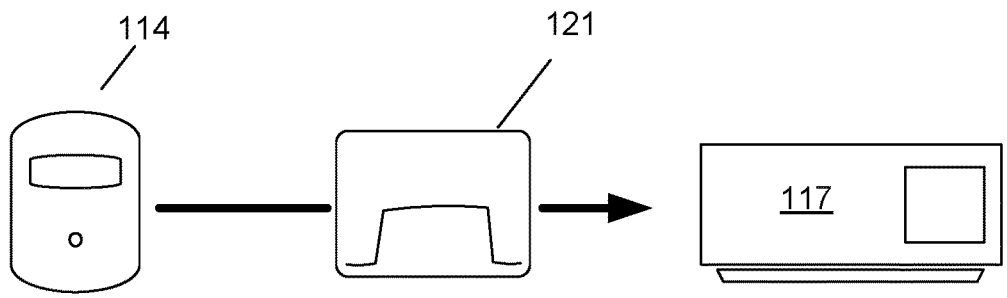
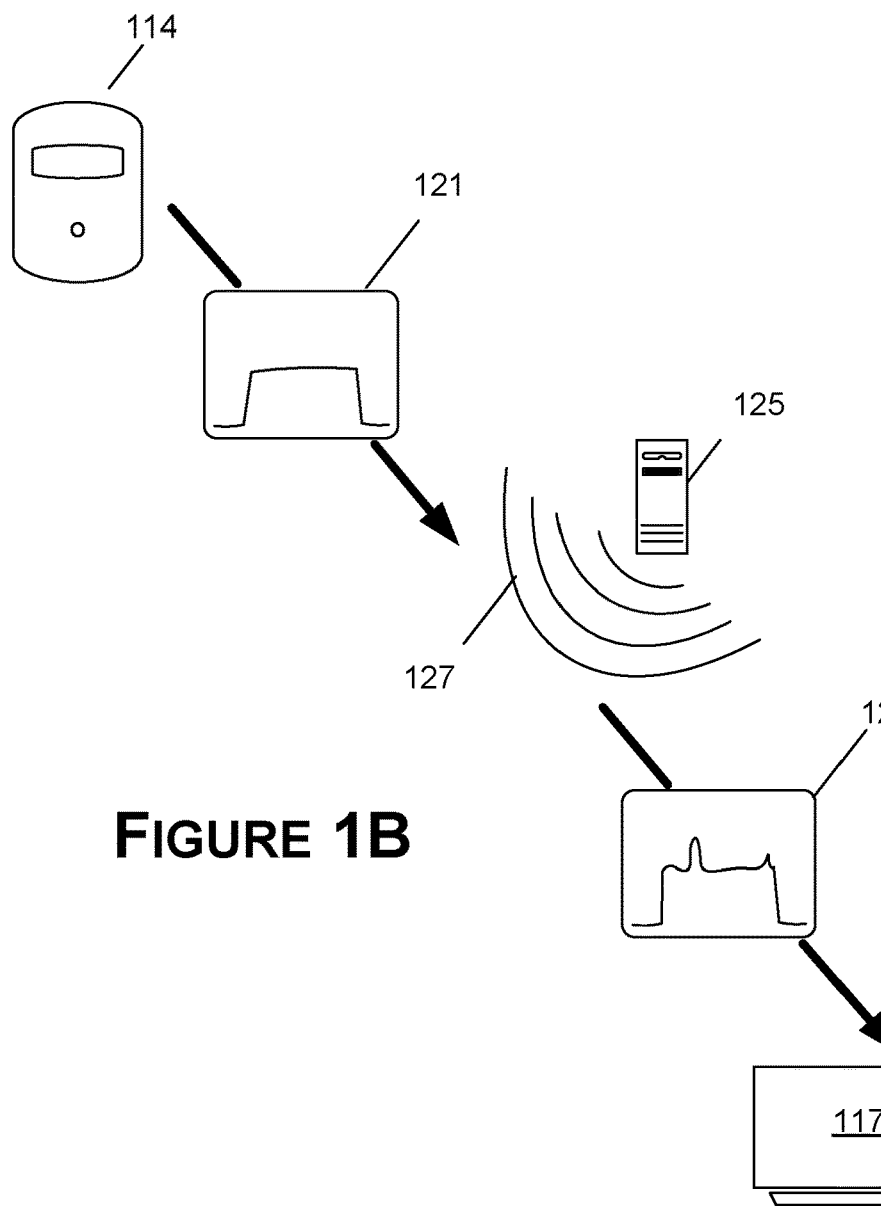
FIGURE 1A
FIGURE 1B

SELECTIVE NARROWBAND INTERFERENCE CANCELLATION

BACKGROUND

Home automation allows homeowners and renters to monitor, track, and control various devices in and around a building. Network devices may be installed to provide this functionality. Network devices may communicate with other devices using wireless signals. When network devices are battery operated, the degree of wireless communication may be limited or otherwise optimized to conserve energy. In addition, when multiple network devices are installed, signal interference may occur if two network devices transmit simultaneously. Signal interference may prevent a network device from properly communicating.

BRIEF DESCRIPTION OF THE DRAWINGS

The various embodiments of the present disclosure including selective narrowband interference cancellation now will be discussed in detail with an emphasis on highlighting the advantageous features. These embodiments depict novel and non-obvious methods and systems for selective narrowband interference cancellation shown in the accompanying drawings, which are for illustrative purposes only. These drawings include the following figures, in which like numerals indicate like parts:

FIGS. 1A-B are schematic diagrams of examples of wireless communication between two network devices according to various aspects of the present disclosure;

DETAILED DESCRIPTION

Figure 2:
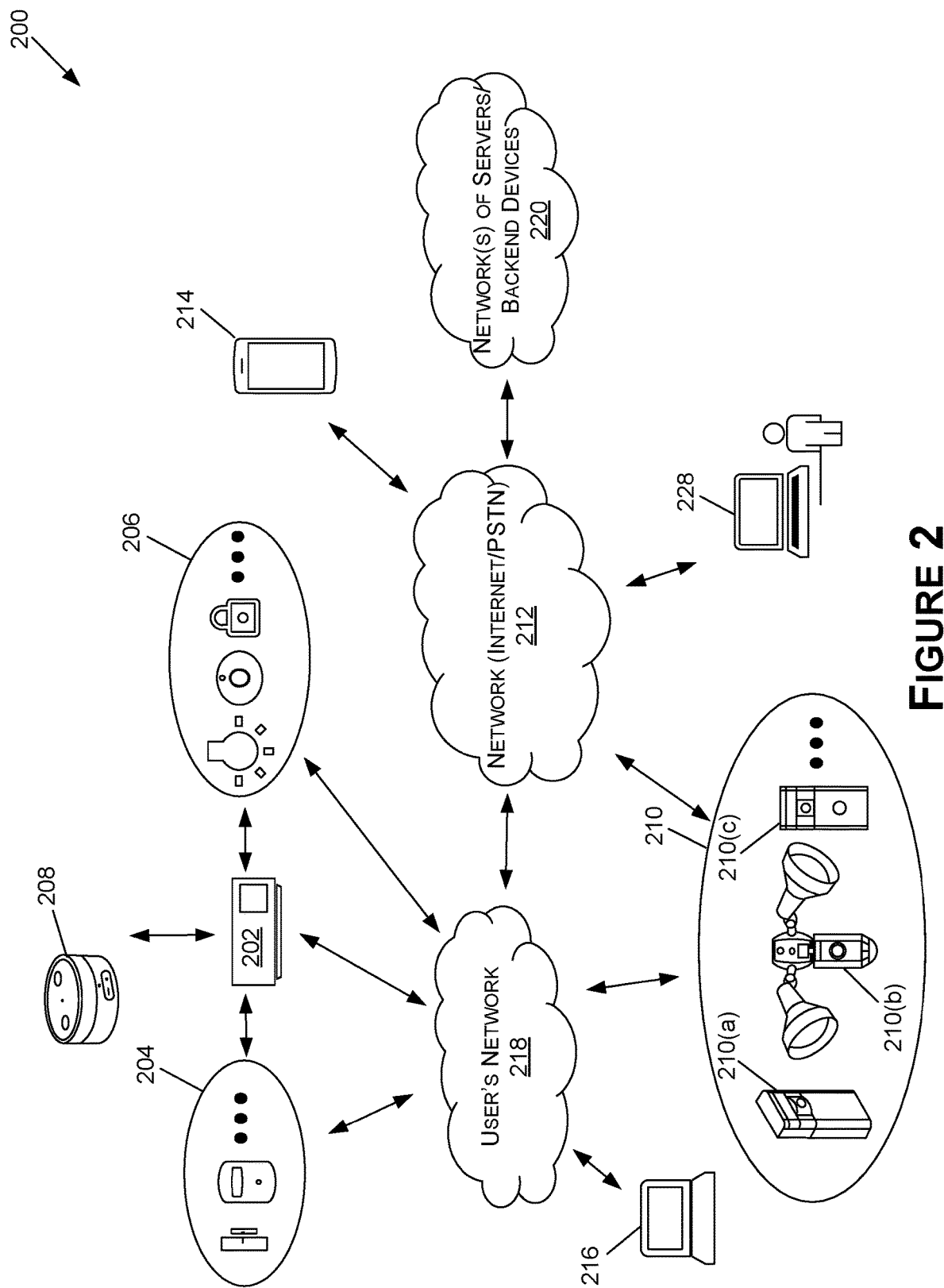
FIG. 2 is a functional block diagram illustrating a system for communicating in a network according to various aspects of the present disclosure.

The present disclosure relates to selective narrowband interference cancellation. A wireless receiver receives electromagnetic signals made up of data encoded on a carrier wave. It is possible that other sources of electromagnetic radiation contribute to interference as the signal is received, which may cause the data encoded in the signal to be erroneous, corrupt, or undecodable. Because it is difficult to distinguish between the originally transmitted signal and interference components, interference cancellation may be challenging. According to embodiments, the present disclosure is directed to selectively removing specific frequency ranges from a received signal based on performing signal-to-interference-plus-noise ratio (SINR) calculations.

For example, a received signal may be transformed into frequency-domain data. The frequency-domain data may contain a plurality of bins corresponding to frequency ranges, and each bin may have a corresponding bin energy level. An interference detector may identify one or more candidate bins having a bin energy level that exceeds a threshold bin energy level. Bins having an energy level that is substantially above a mean or median bin energy level, or an expected energy level, may be considered candidate bins because they potentially contain interference. In other words, the interference component at specific frequencies may cause one or more particular bins to deviate from a normal or expected energy level.

A filter may attenuate the energy level of the candidate bin(s). Attenuation of energy levels refers to the lessening, reduction, removal, or elimination of energy levels for a particular bin. This may involve by removing the bin(s) from consideration, canceling the value(s) of the bin(s), blocking the bin(s), assigning a zero value to the bin(s), or otherwise deleting the data associated with the candidate bin(s). This attenuation of the energy level of the candidate bin(s) produces filtered data. However, filtering the data removes the frequency components of the candidate bin(s), thereby possibly affecting the encoded data. A signal-to-interference-plus-noise ratio (SINR) calculator may generate a first SINR value based on the unfiltered data and generate a second SINR value based on the filtered data. The data corresponding to the superior SINR value is selected as an output and is then demodulated to extract the encoded data.

The remaining detailed description describes the present embodiments with reference to the drawings. In the drawings, reference numbers label elements of the present embodiments. These reference numbers are reproduced below in connection with the discussion of the corresponding drawing features.

FIG. 1A is a schematic diagram of an example of wireless communication between two network devices according to various aspects of the present disclosure. Wireless communication may take place between a first network device 114 and a second network device 117. The network devices 114, 117 may be any electronic devices that are capable of communicating wirelessly with other electronic devices. For example, the network devices 114, 117 may include a communication module having a transmitter and/or receiver. The network devices 114, 117 communicate according to a wireless protocol such as, for example, a Long Range (LoRa) wireless protocol, as described in more detail below. The first network device 114 transmits a signal 121 to the second network device 117 according to the wireless protocol so that the second network device can properly demodulate and decode the signal 121. For example, the first network device 114 may be a sensor that captures audio, video, or other environmental conditions. The second network device 117 may be a hub or other centralized communication device that receives data from the first network device 114 and forwards the data to an endpoint in a network. To provide another non-limiting example, the first network device 114 may be a tracking device (e.g., a pet tracker) and the second network device 117 may be a gateway. The tracking device and the gateway may communicate over a network such as, for example, a low-power wide-area network (LPWAN). The tracking device may be battery powered, and may periodically communicate with the gateway in a manner that conserves battery resources.

In some embodiments, the first network device 114 is battery operated. As a result, to conserve energy, the first network device 114 may transmit the signal 121 at a period of time that decreases energy consumption without hindering its ability to communicate in a timely manner. For example, transmitting the signal 121 once a minute instead of once a second may result in substantial energy savings. The signal 121 may also be used to communicate important information such as, for example, information about the status of a door lock, information about the detection of a security threat, information about a potential fire, smoke, or dangerous environmental conditions. It may be important for the signal 121 to be accurately transmitted and received by the second network device 117. If the data conveyed by the signal is not accurately received, a dangerous or undesirable condition may be created through inaccurate communication.

FIG. 1B is a schematic diagram of an example of wireless communication between two network devices in the presence of interference according to various aspects of the present disclosure. FIG. 1B shows the first network device 114 that transmits the signal 121 (referred to as the transmitted signal 121) to the second network device 117. In addition, an interference source 125 generates an interference signal 127 that alters the transmitted signal 121 as it is received by the second network device 117. The second network device 117 receives a received signal 129 that may be different from the transmitted signal 121 due to the interference signal 127.

The transmitted signal 121 may be generated by modulating data using a carrier wave. The carrier wave conforms to a wireless protocol. A wireless protocol is typically defined in terms of a frequency range or band. Typical bands include 433 MHz, 868 MHz, 915 MHz, 2.4 GHz, 5.0 GHz. The interference source 125 may be a third network device or some other source that produces electromagnetic radiation within the frequency band of the transmitted signal 121. There are generally two types of interference: broadband and narrowband. Broadband interference refers to interference across a broad frequency range. Broadband interference may introduce an offset into the transmitted signal 121 so that most or all frequency components of the transmitted signal are increased by the offset. The offset may be frequency dependent such that the offset varies across the frequencies of a band. Narrowband interference refers to interference where a narrow range of frequencies affect the transmitted signal 121. Here, the frequency components of some, but not all frequencies in the transmitted signal 121 are affected by various offsets at different frequencies. For example, two separate wireless networks using the same protocol may lead to narrowband interference. To illustrate, a first LoRa network may include a network device 117, such as, for example, a gateway that receives sensor data from a first network device 114, such as, for example, a first sensor. A separate LoRa network may include a second sensor that periodically transmits data in the same or similar frequency range, such that the second sensor is an interference source 125. The gateway may then receive a received signal 129 that includes the transmitted signal 121 of the first sensor and interference 127 originating from the second sensor. As another non-limiting example, the first network device 114 may communicate with the second network device 117 over a 500 KHz channel centered at 925 MHz as part of a LoRa network. The interference source 125 may produce an interference signal 127 that is around 50 KHz wide within the bandwidth and may last only 40 milliseconds in duration. The interference signal may span about five LoRa symbols in time, which may make it difficult to properly decode the received signal 129.

In the example, of FIG. 1B, narrowband interference (the interference signal 127) causes some frequency ranges in the transmitted signal 121 to be modified as the received signal 129 is received by the second network device 117. If the interference signal 127 is strong enough, the second network device 117 may be unable to discern the transmitted signal 121 from the interference. As more interference sources are introduced into a communication environment, the amount of interference may increase. For example, two different network devices may transmit signals in the same band at the same time. This may lead to the received signal 129 that includes interference components. The introduction of interference hinders the modulated data from properly being extracted for subsequent processing.

To address the problems arising from narrowband interference, the present disclosure is directed to applying selective interference cancellation in the second network device 117 as it processes the received signal 129. The received signal 129 is converted into frequency-domain data. A signal may be expressed in the time domain or the frequency domain. When expressed in the time domain, the signal may conform to a sinusoidal wave that changes amplitude along the y-axis as it progresses in time along the x-axis. In this respect, a signal is characterized as a set of amplitudes that change over time. When expressed in the frequency domain, a signal that lasts for a predefined period of time is characterized as a set of coefficients corresponding to frequency components. These coefficients correspond to energy levels of each frequency component. The larger the coefficient, the larger the energy, and the stronger the frequency component is with respect to the overall signal. To convert a signal from the time domain into the frequency domain, a Fourier transformation is used to mathematically derive the coefficients of each frequency component. When converting a signal from the frequency domain to the time domain, an inverse Fourier transformation is applied. In some embodiments, a Fourier transformation may be applied to the received signal to identify contiguous bins or frequency ranges within the received signal 129 such that each bin corresponds to a frequency energy level. If a bin has an energy level that is substantially above an expected energy level (a candidate bin), then it may be inferred that a narrowband interference component is present within the frequency range of the candidate bin. SINR values are determined for two versions of the received signal, where the SINR value corresponds to the signal quality. The first version is the received signal and the second version is the received signal with the candidate bins removed. In other words, the second version may be considered a filtered version such that specific frequencies are filtered out.

The SINR values for these two versions are calculated and the version having the better SINR value is selected for demodulation. Interference cancellation is thus selectively applied based on whether or not filtering improves the SINR of the received signal. The determination of whether to selectively apply interference cancellation involves converting the received signal into the frequency domain. Moreover, because demodulation is performed on time-domain data, the frequency-domain data may be converted into a time-domain signal before demodulation. This processing may involve a significant use of resources, such as processing resources and time. By selectively applying interference cancellation, performing a time domain conversion (e.g., inverse Fourier transformation) may be omitted if the SINR value of the received signal is better than the SINR value of the filtered version.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Network devices include various devices that communicate wireless such as, for example, smart home devices. Smart home devices (e.g., hub devices 202, sensors 204, automation devices 206, a virtual assistant (VA) device 208, Audio/Video (A/V) recording and communication devices 210, etc.), when remotely monitored and controlled via a network (Internet/a public switched telephone network (PSTN)) 212, may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, a communication hub, or an intelligent personal assistance device) from which the system may be controlled through various user interfaces, such as voice commands and/or a touchscreen. Various examples of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, and/or the client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low-power wide-area networks (LP-WAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively referred to herein as "A/V devices 210" or "A/V device 210") (which may represent, and/or be similar to, the network devices 114, 117 of FIGS. 1A and 1B). The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a hub device 202 connected to the user's network 218 and/or the network (Internet/PSTN) 212. The hub device 202 may also refer to the network devices 114, 117 of FIGS. 1A and 1B. The smart-home hub device 202 (also known as a home automation hub, gateway device, or network device), may comprise any device that facilitates communication with and control of the sensors 204, automation devices 206, the VA device 208, and/or the one or more A/V devices 210, each of which may be the network devices 114, 117 as described in FIGS. 1A and 1B. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at a location, such as a property, building, home, business, or premises for the purpose of securing and/or automating all or a portion of the location.

The system 200 may further include one or more client devices 214, 216 (which may represent, and/or be similar to, the network devices 114, 117 of FIGS. 1A and 1B). The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices (which may be referred to interchangeably as "cloud storage device(s)"), one or more servers, and one or more backend application programming interfaces (APIs).

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE- 4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, sensors 204, automation devices 206, the VA device 208, the A/V devices 210, or client devices 214, 217 and/or any of the components of the network(s) of may be referred to herein as a "network device" or "network devices." In this respect network device refers to a device that communicates wirelessly according to a wireless protocol. The network devices 114, 117 of FIG. 1 may include one or more of the network devices described herein.

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control its own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of servers/backend devices 220).

Figure 3:
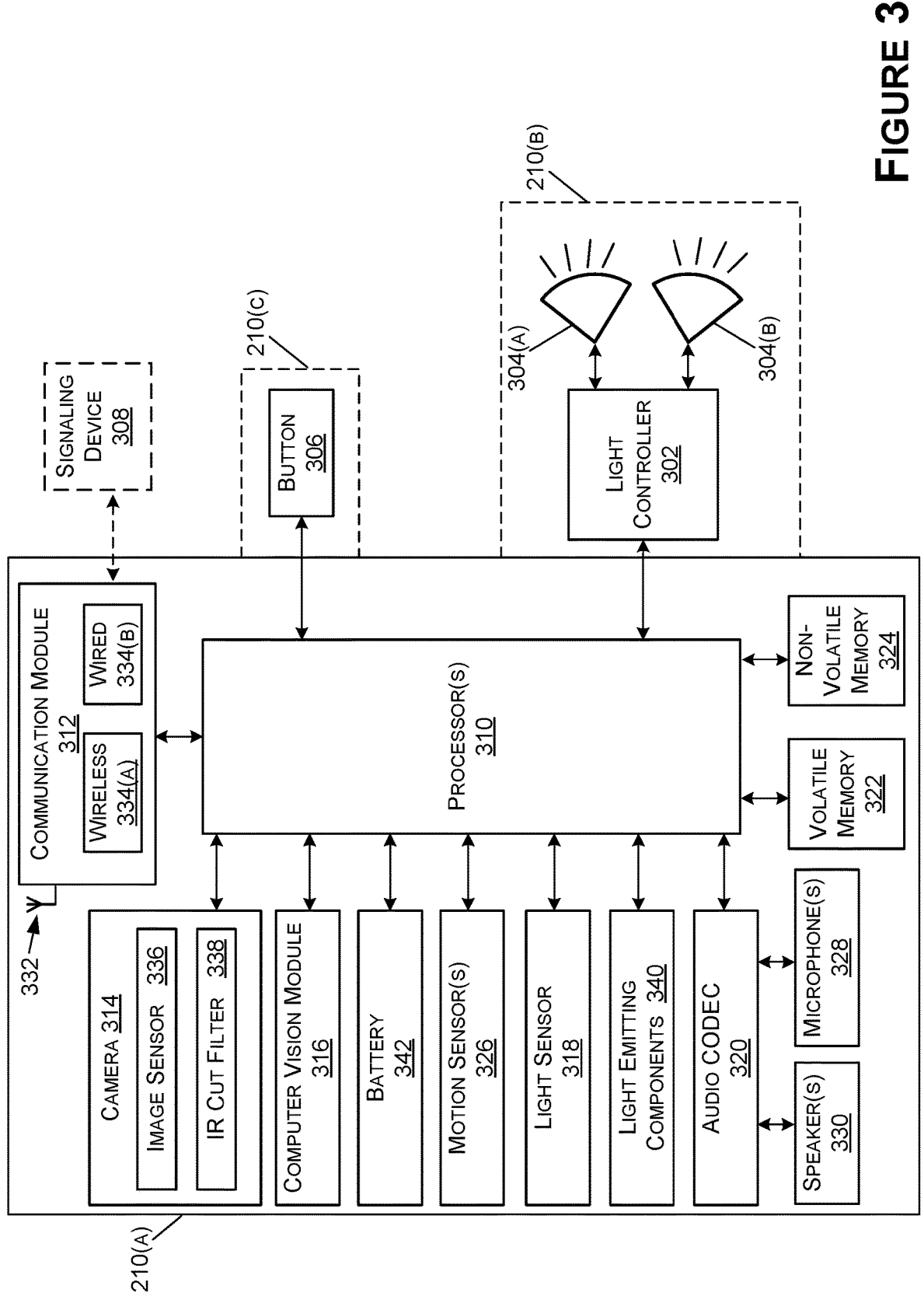
FIG. 3 is a functional block diagram of a network device according to various aspects of the present disclosure.

FIG. 3 is a functional block diagram for a network device such as, for example an audio/video (A/V) device according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or another wireless communication protocol).

With further reference to FIG. 3, the A/V device 210 may include one or more processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the A/V device 210 and other, external devices, external receivers, external transmitters, and/or external transceivers, including client device 214, 216 and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/backend devices 220 described in FIG. 2). The communication module 312 may include wireless 334(a) and wired 334(b) adapters. For example, the communication module 312 may include one or more wireless antennas, radios, receivers, transmitters, and/or transceivers (shown in more detail with respect to FIGS. 6A and 6B) configured to enable communication across one or more wireless networks, such as, without limitation, Wi-Fi, cellular, Bluetooth, Z-Wave, Zigbee, LPWAN(s), and/or satellite networks. The communication module 312 may receive inputs, such as power and/or data, from the camera 314, the processor(s) 310, the button 306 (in embodiments where the A/V device 210 is the video doorbell 210(c)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(c) is pressed, the communication module 312 may be triggered to perform one or more functions, such as to transmit a signal over the wired 334(b) connection to the signaling device 308 (although, in some embodiments, the signal may be transmitted over a wireless 334(a) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 340 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not to be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view.

In some embodiments, computer vision module(s) (CVM) 316 may be included in the A/V device 210 as the motion sensor(s) 326, in addition to, or alternatively separate from, other motion sensor(s) 326. For example, the CVM 316 may be a low-power CVM (e.g., Qualcomm Glance®) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

Again, with reference to FIG. 3, in embodiments where the A/V device 210 includes a light camera, the A/V device 210 may include the light controller 302 and one or more lights 304(*a*), 304(*b*) (collectively referred to herein as "lights 304"). The light controller 302 may include a switch for controlling the lights 304. For example, in response to the motion sensor(s) 326 and/or the camera 314 detecting motion, the light controller 302 may receive an output signal from the processor(s) 310 that causes the light controller 302 to activate the one or more lights 304(*a*), 304(*b*). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to begin recording the image data, and the microphone(s) 328 to begin recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(*c*), the A/V device 210 may include the button 306. In embodiments where the button 306 is a mechanical button (e.g., has a range of movement), the button 306 may make contact with a button actuator located within the video doorbell 210(*c*) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(*c*), such as transmitting an output signal, using the communication module 312, to the signaling device 308 to cause the signaling device 308 to output a sound (e.g., via the wired 334(*b*) connection to the signaling device 308 and/or a wireless 334(*a*) connection to the signaling device 308). In addition, the processor(s) 310 may transmit an output signal (e.g., a message), using the communication module 312, to the client device(s) 214, 216 to indicate to the user(s) of the client device(s) 214, 216 that a person is present at the A/V device 210 (in some embodiments, via at least one of the hub device 202, the VA device 208, and/or one or more components of the network of servers/backend devices 220).

Although the A/V recording and communication device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
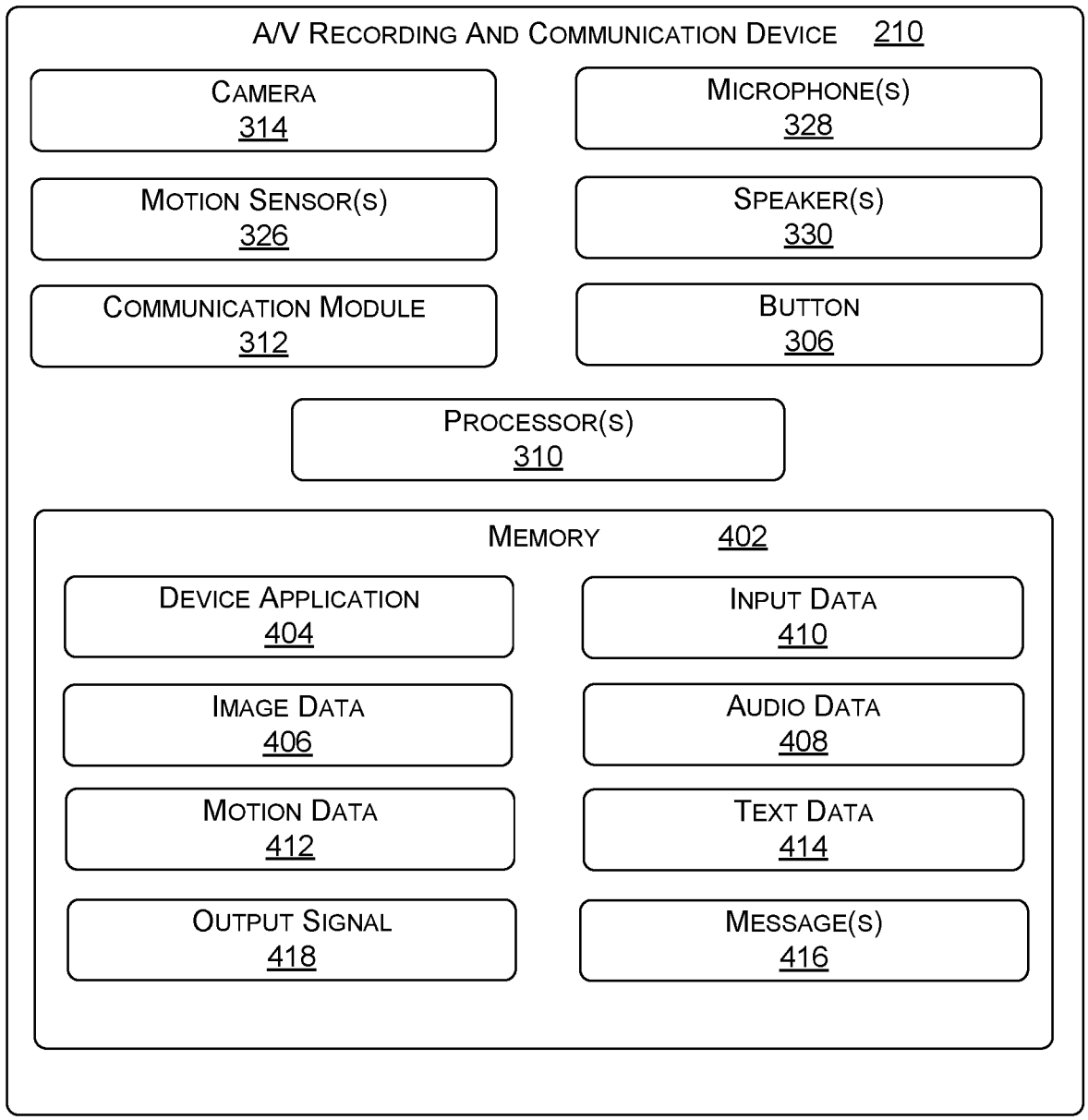
FIG. 4 is a functional block diagram illustrating one example of a network device according to various aspects of the present disclosure.

FIG. 4 is another functional block diagram illustrating an embodiment of the A/V device 210 according to various aspects of the present disclosure. In some embodiments, the A/V device 210 may represent, and further include one or more of the components from, the A/V recording and communication doorbell 210(*c*), the A/V recording and communication security camera 210(*a*), and/or the floodlight controller 210(*b*). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may configure the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the server 224 using the communication module 312. In various embodiments, the device application 404 may also configure the processor(s) 310 to generate and transmit an output signal 418 that may include the image data 406, the audio data 408, the text data 414, the input data 410, and/or the motion data 412. In some of the present embodiments, the output signal 418 may be transmitted to the server 224 and/or the hub device 202 using the communication module 312. The server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the server 224, and the server 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(*c*)), the A/V device 210 may not include the button 306, and the A/V device 210 may not generate the input data 410.

With further reference to FIG. 4, a message 416 may be generated by the processor(s) 310 and transmitted, using the communication module 312, to the client device 214, 216, the server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia service (MMS) messages, voicemail messages, video signals, audio signals, data transmissions, and/or any other type of electronic communication that an electronic device can send to another electronic device.

The image data 406, the audio data 408, the text data 414, and/or the motion data 412 may be tagged (e.g., with a time stamp, based on clock data) and/or stored separately (e.g., on the server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

Figure 5:
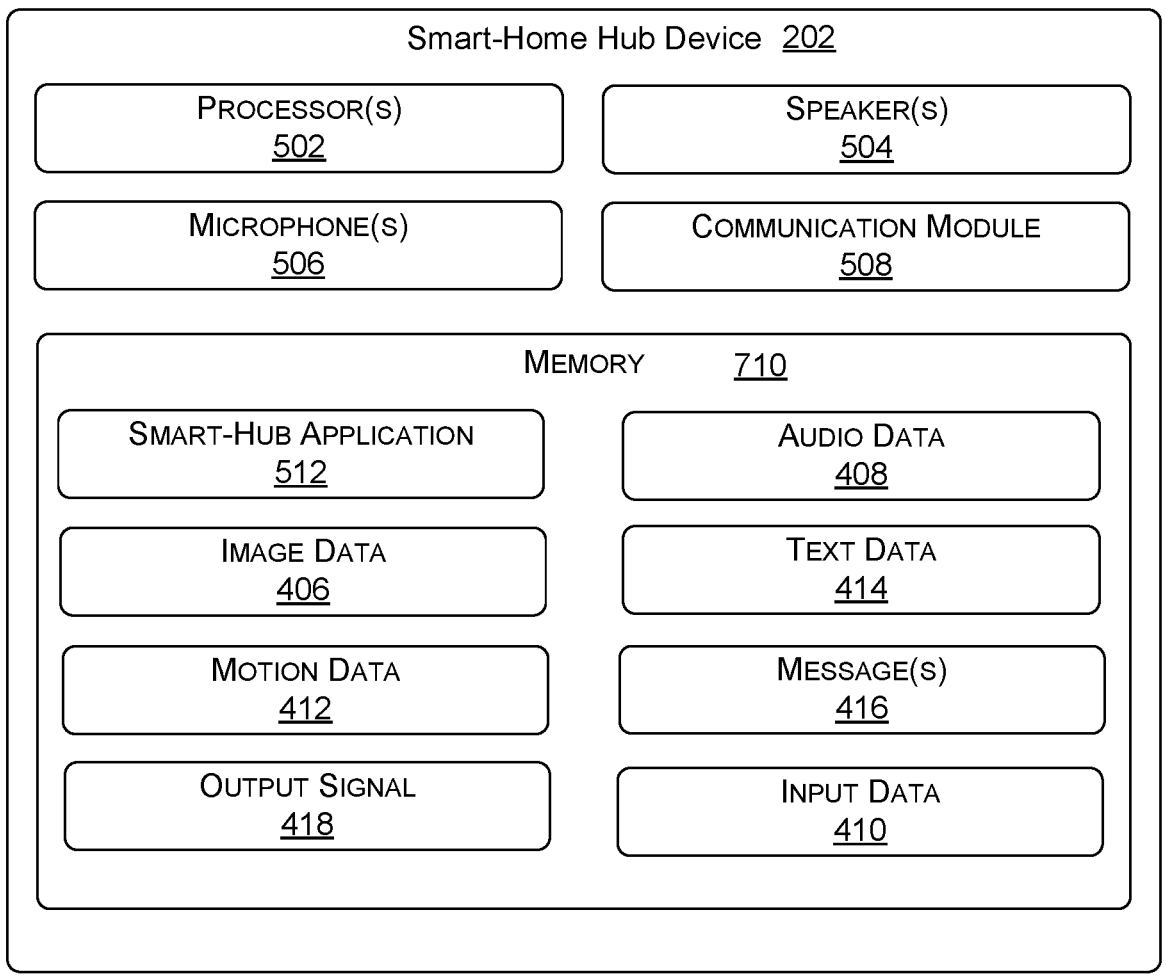
FIG. 5 is a functional block diagram illustrating one example of a smart-home hub device according to various aspects of the present disclosure.

FIG. 5 is a functional block diagram illustrating an embodiment of the smart-home hub device 202 according to various aspects of the present disclosure. The hub device 202 is an example of a network device and may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. The hub device 202 may comprise processor(s) 502 (which may be similar to, and/or include similar functionality as, the processor(s) 310) that are operatively connected to speaker(s) 504, microphone(s) 506, a communication module 508 (which may be similar to, and/or include similar functionality as, the communication module 310), and memory 510 (which may be similar to, and/or include similar functionality as, the memory 402). In some embodiments, the hub device 202 may further comprise one or more cameras (not shown). In some embodiments, the hub device 202 may not include one or more of the components shown in FIG. 5, such as the speaker(s) 504 and/or the microphone(s) 506.

As shown in the example of FIG. 5, the memory 510 stores a smart-home hub application 512. In various embodiments, the smart-home hub application 512 may configure the processor(s) 502 to receive sensor data from the sensors 204 and/or the automation devices 206. For example, the sensor data may include a current state (e.g., opened/closed for door and window sensors, motion detected for motion sensors, living room lights on/off for a lighting automation system, etc.) of each of the sensors 204 and/or the automation devices 206. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors 204 and/or the automation devices 206 as well as any updates to the current state based on sensor triggers.

With further reference to FIG. 5, the smart-home hub application 512 may configure the processor(s) 502 to receive the audio data 408, the text data 414, the image data 406, the motion data 412, the input data 410, and/or the messages 416 from the A/V device 210 (in some embodiments, via the server 224) using the communication module 508. For example, the hub device 202 may receive and/or retrieve (e.g., after receiving a signal from the A/V device 210 that the A/V device 210 has been activated) the image data 406, the input data 410, and/or the motion data 412 from the A/V device 210 and/or the server 224 in response to motion being detected by the A/V device 210. The smart-hub application 512 may then configure the processor(s) 502 to transmit, using the communication module 508, the audio data 408, the text data 414, the image data 406, the motion data 412, the input data 410, and/or the messages 416 to the client device 214, 216, the server 224, and/or an additional electronic device (e.g., a second A/V device 210, the automation device(s) 206, the sensor(s) 204, etc.).

Figure 6A:
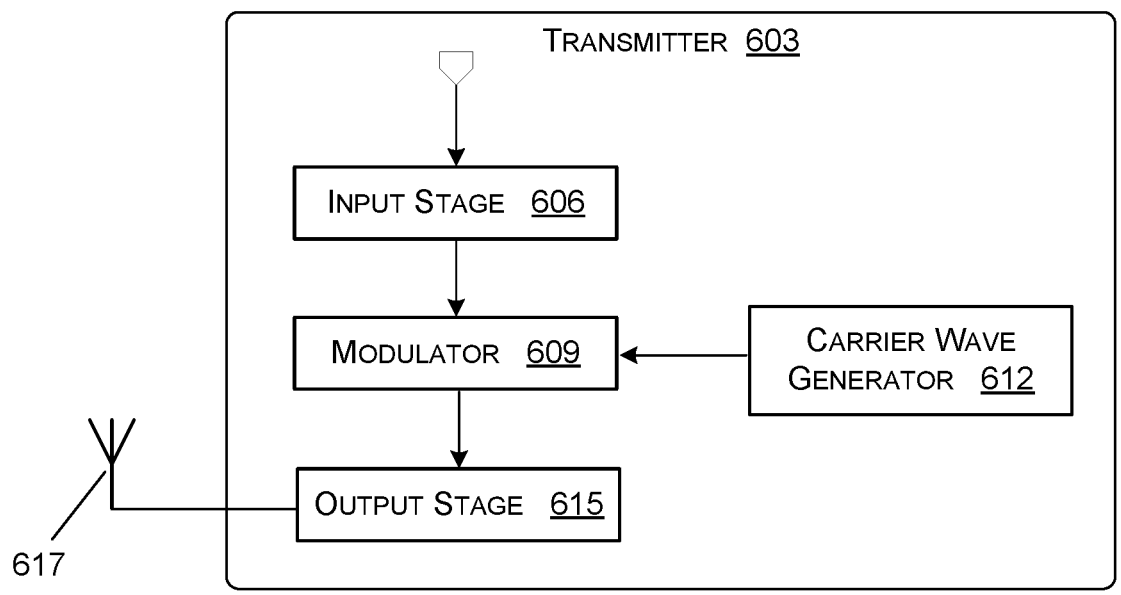
FIG. 6A is a functional block diagram illustrating one example of a transmitter of a communication module according to various aspects of the present disclosure.

FIG. 6A is a functional block diagram illustrating one embodiment of a transmitter 603 of a communication module according to various aspects of the present disclosure. The transmitter 603 may be part of a communication module of a network device such as, for example, the communication module 312 of FIG. 3 or the communication module 508 of FIG. 5. The transmitter 603 may be part of the physical layer of a communication module. The transmitter 603 may be part of a transceiver or separate from a receiver. The transmitter 603 may be part of a radio frequency (RF) component that is coupled to at least one antenna for transmitting a signal. The transmitter receives data and converts it to a transmitted signal such as the transmitted signal 121 of FIG. 1B. The transmitter 603 includes an input stage 606, a modulator 609, a carrier wave generator 612, and an output stage 615. The transmitter 603 may be designed to conform to a wireless protocol such as, for example, Wi-Fi (e.g., the user's network 218), X10, Ethernet, RS-485, 6LoWPAN, Bluetooth LE (BLE), ZigBee, Z-Wave, and/or a low-power wide-area network (LPWAN), such as a chirp spread spectrum (CSS) modulation technology network (e.g., LoRaWAN), an Ultra Narrow Band modulation technology network (e.g., Sigfox, Telensa, NB-IoT, etc.), and/or the like.

The input stage 606 receives information to be communicated over a wireless network. The information may originate from a hub device 202, sensor 204, automation device 206, virtual assistant (VA) device 208, Audio/Video (A/V) recording and communication devices 210, or any other network device. The information may include digital samples pertaining to sensor readings or pertaining to data or control information, for example. The information may include important environmental information to be conveyed to another network device. The information may also include control instructions or commands to control an external device. The information may be expressed in digital or analog format as a signal. A signal may refer to information embodied on an electromagnetic wave that is transmitted over air (e.g., a wireless signal) or through conductive material (e.g., a wired signal). The information may include data that is subject to communication between two devices or it may include control information used to instruct a device to perform operations.

The input stage 606 may amplify the signal and prepare it for modulation. The modulator 609 is configured to receive a carrier wave from the carrier wave generator 612 and encode the information onto the carrier wave. A carrier wave is an electromagnetic wave that is modulated to convey information, thereby resulting in a signal. Without modulation, a carrier wave alone contains no information. The characteristics of a carrier wave (e.g., its frequency) are dictated by the intended type of wireless transmission protocol. The carrier wave 612 is generated according to the transmission protocol. The transmission protocol defines the type and manner of modulation. For example, data may be modulated according to amplitude, frequency, phase or a combination thereof. After the modulator encodes the information by generating a modulated signal, the modulated signal is received at the output stage 615. The output stage 615 may include a power amplifier to amplify the modulated signal. The output stage 615 may up-convert the modulated signal to a high frequency according to the transmission protocol. Then, the output is transmitted to at least one antenna 617, resulting in a transmitted signal such as the transmitted signal 121 of FIG. 1B. The transmitted signal includes the encoded information and is formatted according to the transmission protocol.

Figure 6B:
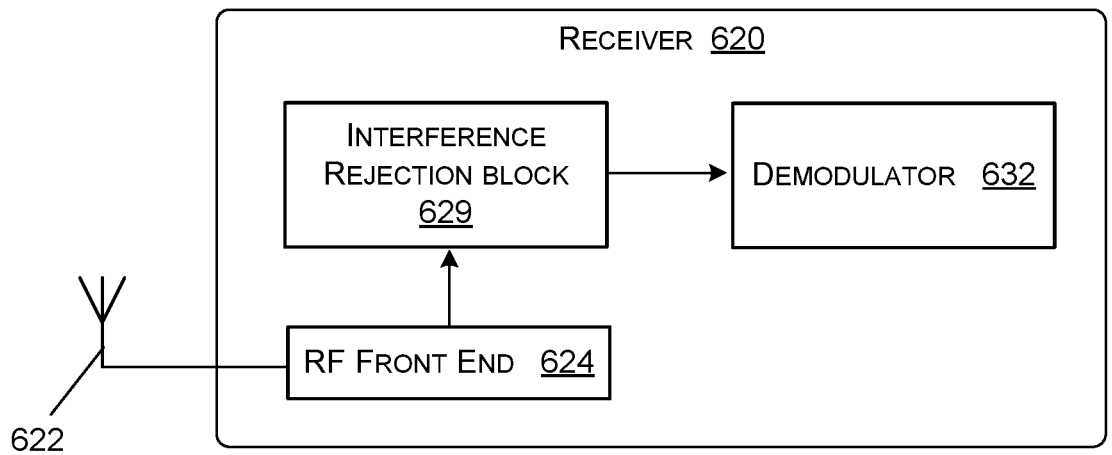
FIG. 6B is a functional block diagram illustrating one example of a receiver of a communication module according to various aspects of the present disclosure.

FIG. 6B is a functional block diagram illustrating one embodiment of a receiver 620 of a communication module according to various aspects of the present disclosure. The receiver 620 may be part of a communication module of a network device, such as the communication module 312 of FIG. 3 or the communication module 508 of FIG. 5. The receiver 620 may be part of the physical layer of a communication module. The receiver 620 may be part of a transceiver or separate from a transmitter. The receiver 620 may be part of a radio frequency (RF) component that is coupled to at least one antenna for receiving a signal, such as the received signal 129 of FIG. 1B, and demodulating the received signal to extract encoded information for subsequent processing. The receiver 620 includes at least one antenna 622, an RF front end 624, an interference rejection block 629, and a demodulator 632 that extracts encoded information according to the wireless protocol of the received signal. The RF front end 624 receives the received signal from the at least one antenna 622, and may down-convert the received signal to a lower frequency range. The RF front end 624 may amplify the received signal and pass it to the interference rejection block 629.

Embodiments of the present disclosure involve the interference rejection block 629 that selectively applies interference attenuation to a received signal. While the interference rejection block 629 may be applied in a variety of types of receivers, it may be suitable for transmission protocols that implement wide band signals or spread spectrum techniques. Transmission protocols that implement wide band signals may use techniques of frequency or channel hopping over a wide band such that the transmitted signal is generated by encoding information using a wide range of frequencies over a short period of time. In a spread spectrum-based communication system, a signal is spread across a relatively wide bandwidth, resulting in a signal that includes a large bandwidth. Thus, unlike other wireless communication techniques that may limit a signal to a narrow band for a particular period of time, spread spectrum-based communication intentionally encodes information on a signal that spans a relatively large bandwidth over a small period of time. Several advantages to spread spectrum include, for example, greater resistance to Doppler shift and suitability for lower power applications. However, spread spectrum-based communication may be susceptible to narrowband interference, given that the signal encompasses a wide range of frequencies, which may overlap with a frequency range of an interference signal.

One example of a spread spectrum-based protocol is a chirp spread spectrum (CS S), in which data is modulated on a chirp. A chirp is a signal that is either an upward frequency sweep across the band or a downward frequency sweep across the band. This chirp signal is called a chirp symbol. A chirp signal is a sinusoidal wave whose frequency is increasing linearly over time. The modulation for such CSS-based communication may use 500 KHz of bandwidth, for example. Here, the chirp signal may start at a zero frequency and linearly increase to 500 KHz. The time it takes to get to 500 KHz depends on a spreading factor (SF). For a spreading factor (SF) of 12, and a bandwidth of 500 KHz, it takes about 8.2 milliseconds (ms) to sweep the frequency. Therefore, longer chirps may be more susceptible to overlap with interference signals. Similarly, chirp signals occupying a larger bandwidth may be more susceptible to overlap with interference signals. LoRa (Long Range) is an example of a CSS-based communication protocol. LoRa provides a low-power wide-area network that may use bands such as, for example, 433 MHz, 868 MHz, 915 MHz, or 923 MHz. In LoRa, information is encoded on chirp symbols that span a range of frequencies according to a range of spreading factors. A LoRa chirp signal is a sinusoidal wave having a frequency that increases or decreases linearly over time. The LoRa chirp signal can be represented as: s(t)=exp(j*2*pi*F(t)*t), where F(t) is the constantly increasing frequency. The modulation for a LoRa network may use 500 KHz of bandwidth (BW). In this case, the chirp signal may start at zero frequency and linearly increase to 500 KHz. The time it takes to get to 500 KHz depends on the spreading factor. For a spreading factor (SF) of 12 and BW=500 KHz, it takes about 8.2 mS to sweep the frequency. This is also the LoRa chirp symbol duration in terms of time. To encode information into a LoRa symbol, the chirp signal is circularly shifted by a time slot among a set of time slots corresponding to the spreading factor.

A received chirp signal in the time domain appears as a sinusoidal wave with increasing or decreasing frequency. When converted into the frequency domain, the signal appears as a flat line as each frequency component across the bandwidth has a similar energy level or coefficient. To decode a LoRa chirp signal, a matched filter including a baseline chirp signal is first multiplied by the complex conjugate of the received signal. Thereafter, the result is converted into the frequency domain and the frequency bin with the maximum energy level is selected.

The interference rejection block 629 is configured to analyze the received signal in the frequency domain to identify abnormal frequencies among the broad spectrum. In addition, a decision is made whether to demodulate the received signal as it is received or to demodulate a version of the signal with the abnormal frequencies attenuated. This may involve removing the bin(s) from consideration, cancelling the value(s) of the bin(s), blocking the bin(s), assigning a zero value to the bin(s), or otherwise deleting the data associated with the candidate bin(s).

After the decision is made as to which signal to demodulate, the demodulator 632 demodulates the signal to extract the encoded information. When applied to a spread spectrum-based protocol, the demodulator 632 may use a matched filter having a baseline chirp signal that is multiplied by a complex conjugate of the received chirp signal. This processing is performed in the time domain. The result is then converted into the frequency domain to select a maximum frequency. This process allows the information to be extracted from the chirp signal. The interference rejection block 629 is described in more detail with respect to FIGS. 7-9.

Figure 7:
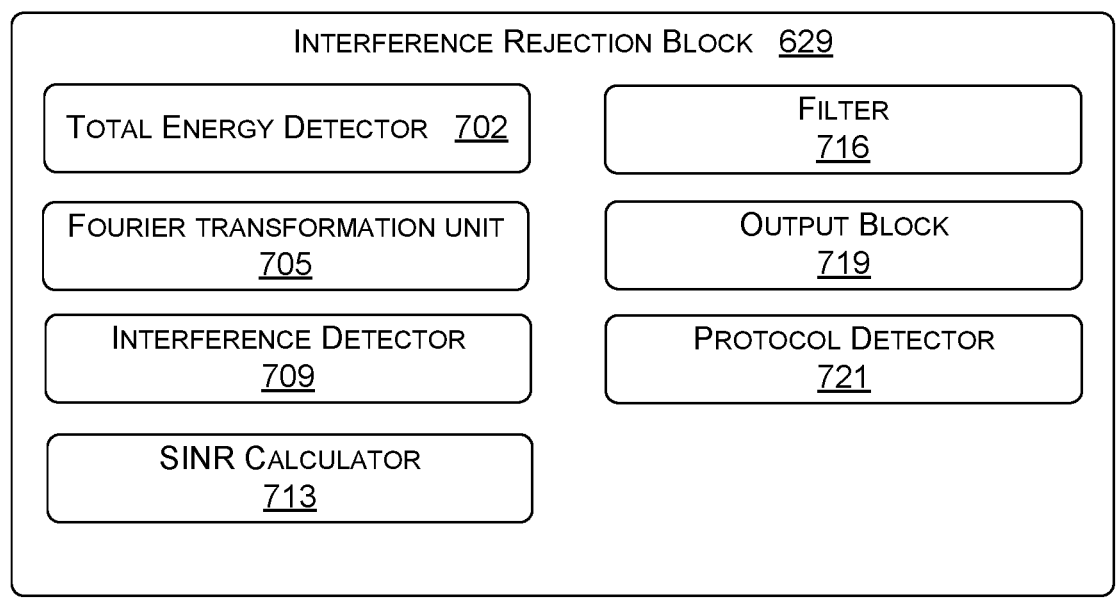
FIG. 7 is a functional block diagram illustrating one example of an interference rejection block of a receiver according to various aspects of the present disclosure.

FIG. 7 is a functional block diagram illustrating one example of an interference rejection block of a receiver according to various aspects of the present disclosure. In some embodiments, the interference rejection block 629 of FIG. 7 may represent, and further include, one or more of the components from the interference rejection block 629 described above with reference to FIG. 6B. Additionally, in some embodiments, the interference rejection block 629 may omit one or more of the components shown in FIG. 7 and/or may include one or more additional components not shown in FIG. 7. Each block shown in FIG. 7 may represent a special-purpose integrated circuit, or represent a section of code or logic that is executed by a processor, or a combination thereof.

The interference rejection block 629 may include a total energy detector 702 that detects the total energy of the received signal, a Fourier transformation unit 705, an interference detector 709, a SINK calculator 713, a filter 716, an output block 719, and a protocol detector 721. The interference rejection block 629 is configured to selectively attenuate interference from a received signal. The interference rejection block 629 is configured to handle the received signal as it is formatted to an intended transmission protocol. The input to the interference rejection block 629 may be a received signal, such as, for example, the received signal 129 of FIG. 1B. The received signal may be processed by an RF front end that down-converts and amplifies the received signal.

Some embodiments include the protocol detector 721, which is configured to analyze the received signal and determine if the received signal includes components of an unintended transmission protocol. For example, an interference source may transmit signals formatted according to a different transmission protocol than the one handled by the receiver 620. The interference signal may overlap with the transmitted signal (e.g., the transmitted signal 121 of FIG. 1B) such that the received signal is a combination of two signals formatted to different transmission protocols. The protocol detector 721 may determine that the received signal includes an additional signal of a different transmission protocol such that it is foreign to the transmission protocol that is handled by the demodulator 632. A foreign transmission protocol may use signals that occupy specific frequencies or patterns of frequencies. For example, the protocol detector 721 may decode the received signal to identify preambles, symbols, headers, or other signatures of a foreign transmission protocol. If the protocol detector 721 determines that a signal of a foreign transmission protocol is present in the received signal, the protocol detector 721 may then generate a reconstructed signal based on decoding the preambles, symbols, headers, or other signatures of the foreign transmission protocol. For example, by knowing the bits of a frequency pattern in an additional signal, the protocol detector 721 may generate a reconstructed signal in the time domain by modulating the data on a carrier signal based on the foreign transmission protocol. The reconstructed signal may represent the additional signal in the time domain as it was transmitted by the interference source 125. The protocol detector 721 may then subtract the reconstructed signal from the received signal.

In this respect, upon identifying the interference pattern associated with the signal formatted to the foreign transmission protocol, the interference may be removed from the received signal. As discussed above, a wireless protocol may use a particular frequency pattern when transmitting a signal, such as a preamble encoded in specific frequencies. The protocol detector 721 may reconstruct a signal based on determining the particular frequency pattern and then subtract the reconstructed signal from the received signal. The protocol detector 721 may thus serve as an initial check to address interference using known signatures of transmission protocols to reduce the need for subsequent interference cancellation operations.

The interference rejection block 629 also includes the total energy detector 702. The total energy detector 702 may determine the total energy of a received signal. The total signal energy is used to approximate whether the received signal potentially includes an interference component. Interference energy may combine with the transmitted signal such that the received signal has a higher total energy than expected. If the total energy of the received signal is below a threshold level, then it may be inferred that the received signal does not include an interference component. The threshold level may be determined according to an average received energy level, a median received energy level, a predefined expected energy level, a statistical deviation from previous energy levels, or any other level that reflects an abnormal or unexpected level.

The total energy detector 702 may also apply a threshold level that is equal to the noise floor. The noise floor is the measure of the signal created from the sum of all the noise sources and unwanted signals in an environment, where noise includes any signal other than the one being monitored. In radio communication and electronics, this may include thermal noise, black body noise, cosmic noise, as well as atmospheric noise, and any other unwanted man-made signals, sometimes referred to as incidental noise. When operating according to a spread spectrum-based communication protocol, transmitted signals are typically below a noise floor. The noise floor may be characterized as a signal-to-noise ratio (SNR). When the SNR of a received signal is above 0, the signal is above the noise floor. In some spread spectrum-based communication protocols, signals may be demodulated when they are below the noise floor. If the total energy of a signal is below a threshold such as, for example, the noise floor, then it may be inferred that no interference component is present in the signal and no interference cancellation is needed.

In some embodiments, the total energy of the received signal is determined in the time domain. For example, an integration operation may be performed on the received signal to determine a total area under the mathematical wave representation of the received signal over a period of time. The result of the integration operation corresponds to the signal energy level, such that signals with larger amplitudes have greater energy than signals with smaller amplitudes. In other embodiments, the total energy of the received signal is calculated in the frequency domain. For example, the energy levels of all frequency bins may be aggregated or otherwise summed to determine the total energy of the signal.

The interference rejection block 629 also includes the Fourier transformation unit 705. The Fourier transformation unit 705 converts the received signal into frequency-domain data. The frequency-domain data may include a finite number of bins, where each bin represents a contiguous frequency range. For each bin, there is a corresponding value, such as, for example, an amplitude, an energy, or a coefficient that correlates to an energy or an amplitude. In some embodiments, the Fourier transformation unit 705 is configured to use a predetermined number of bins to generate the frequency-domain data. More bins means that the frequency-domain data will have more frequency resolution. As a result, the frequency range of each bin reduces when increasing the number of bins.

In other embodiments, the Fourier transformation unit 705 is configured to dynamically vary the number of bins when calculating frequency-domain data. In cases of resolving interference that is very narrowband, the number of bins may be selected so that the frequency resolution of the frequency-domain data is less than the interference bandwidth. For example, if an interference signal having a bandwidth of 10 KHz is expected, and the received signal is 500 KHz, the number of bins selected may be 512 so that the frequency resolution is around 1 KHz. This number of bins may allow for more precision to determine how much of the frequency band should be attenuated. However, if a lower number of bins is selected, such as, for example 50, the frequency-domain data will have bin sizes that span 10 KHz. This increases the risk that the interference signal straddles two adjacent frequency bins. As a result, a 20 KHz range of frequency may be attenuated from the received signal.

Selecting too large of a number of bins may have additional disadvantages. For example, the computational complexity of Fourier transformation increases as N*log 2(N). This demands more processing resources to perform the calculations. In addition, by reducing the number of bins, it may be easier to handle interference that quickly varies over time. So, if the interference signal is arriving in different frequency bins every 10 mS, for example, a smaller bin number may be more desirable to reduce the likelihood that interference does not straddle two bins. Therefore, according to the present embodiments, any desired number of bins may be selected depending on an expected interference signal bandwidth and the bandwidth of the received signal.

In some embodiments, the Fourier transformation unit 705 monitors for interference signals and records the bandwidths of interference signals. The Fourier transformation unit 705 may record a history of interference signals based on the bandwidth and the time they are received. Depending on the bandwidth of an expected interference signal, the Fourier transformation unit 705 may dynamically select a number of bins when generating the frequency-domain data. For example, the number of bins may be selected to be a predetermined fraction of the expected interference signal. In other embodiments, the Fourier transformation unit 705 may dynamically update the number of bins used to generate the frequency-domain data based on the time of day or according to a schedule. For example, if a first type of interference signal is typically received at a first time of day (e.g., in the morning) and has a first bandwidth, and a second type of interference signal is typically received at a second time of day (e.g., in the evening) and has a second bandwidth that is different than the first bandwidth, then the Fourier transformation unit 705 may select a first number of bins to address expected interference at the first time of day and select a second, different number of bins to address expected interference at the second time of day.

The Fourier transformation unit 705 may be a Fast Fourier transform (FFT) block or a discrete Fourier transform (DFT) block, for example. A Fourier transformation refers to any operation that converts time-domain data to frequency-domain data. A DFT operation involves decomposing a sequence of values into components of different frequencies. This operation may involve a significant amount of computation resources. An FFT operation is an optimization of a DFT operation, where in an FFT operation, the transformation involves factorizing DFT data into sparse factors.

The interference detector 709 of the interference rejection block 629 identifies one or more candidate bins having a bin energy level that exceeds a threshold bin energy level. A received signal may be first converted into frequency-domain data by the Fourier transformation unit 705. The interference detector 709 checks the energy level for each bin to see if the bin energy level exceeds the threshold, and any bins having an energy level that exceeds the threshold are selected as candidate bins. The threshold may be based on a statistical departure from a mean or median energy level. For example, the mean or median energy level across all bins may be determined. A threshold may be set based on a predefined standard deviation from the mean or median energy level. The threshold may be a percentage or an absolute value above the mean or median. The threshold may also be a predefined, absolute value.

The filter 716 attenuates the energy levels of the candidate bins from the frequency-domain data to generate processed frequency-domain data. In this respect, the processed frequency-domain data is filtered by notching out or otherwise removing the candidate bins from consideration. In other words, the filter 716 operates as a notch filter that removes one or more specific frequency ranges from the received signal. The filtered frequency-domain data is thereby smaller in size than the unfiltered frequency-domain data.

By filtering out the candidate bins, the signal strength is reduced. The filtering process may remove part of the signal upon which information is encoded. This process could potentially make it more difficult to properly extract the information when demodulating the received signal. However, it is likely that at least some interference component is also removed from the received signal, which could help properly extract the information when demodulating the received signal. Therefore, the filtering process may or may not improve the quality of the received signal. The SINR calculator 713, described below, helps determine whether the filtering process will or will not improve the quality of the received signal.

The SINR calculator 713 calculates the SINR value of the received signal before filtering, and calculates the SINR value of the received signal after filtering. An SINR value is calculated by dividing the signal power by the sum of the noise power and interference power. For example, the SINR value of the received signal may be calculated using the following expression: $S/(V+I)$, where "S" is the signal power of the received signal, "V" is the noise power, and "I" is the interference power. The SINR value of the filtered signal may be calculated using the following expression: $S*(N-Z)/N/V$, where "S" is the signal power of the filtered signal, "V" is the noise power, "N" is the number of total bins, and "Z" is the number of candidate bins that have been filtered out of the received signal.

The signal power is the sum of the amplitude associated with each bin energy level. Power refers to the energy over time. For example, signal power may be calculated by the sum of all energy levels of the frequency components divided by the duration of time used when determining the bin energy values as part of the Fourier transformation. Frequency-domain data with cancelled bins will therefore have a smaller signal power than frequency-domain data without any bins cancelled.

The interference power is based on the amplitude of the candidate bin and the total number of bins. For example, interference power may be the amplitude of the candidate bin squared divided by the total number of bins squared. Interference power may be estimated using the following expression: $X^2/N^2$, where "X" represents the bin energy levels of the candidate bin(s) and where "N" represents the number of total bins.

The noise power is based on the amplitude of the remaining bins that are not candidate bins and the total number of bins. The noise power may be estimated by calculating the mean or median amplitude of the non-candidate bins. Noise power may be estimated using the following expression: $E[Y^2]/N$, where "Y" represents the bin energy levels of each bin other than the candidate bin(s) and where N represents the number of candidate bins.

The signal (filtered or unfiltered) having the larger SINR value is selected, because the SINR value correlates to signal quality. The output block 719 thus selects either the unfiltered signal or the filtered signal based on their respective SINR values. If the unfiltered signal has a larger SINR value, then the unfiltered signal, as formatted in the time domain, is demodulated to extract the encoded or modulated information. In this respect, the interference rejection block 629 preserves the received signal in the time domain so that it can be demodulated in the event that it has a better signal quality over a filtered version of the received signal.

If the filtered version of the received signal has a better signal quality, then the filtered signal is converted into the time domain using an inverse Fourier transform process. The time-domain version of the filtered signal is then demodulated to extract the encoded information.

Figure 8A:
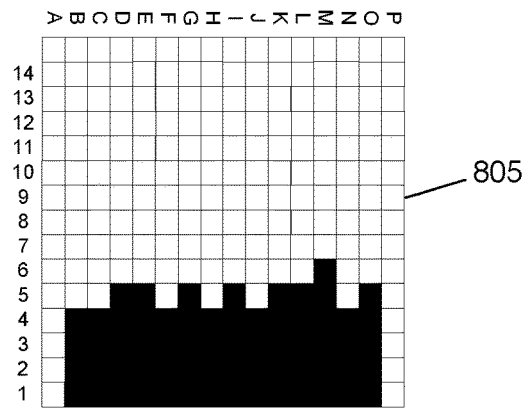
FIGS. 8A-C are drawings of examples of various signals, as expressed in the frequency domain, according to various aspects of the present disclosure.

FIG. 8A is a drawing of an example of a received signal 805 without interference as expressed in the frequency domain, according to various aspects of the present disclosure. FIG. 8A illustrates how a signal without interference would be represented if converted into the frequency domain. When represented in the frequency domain, the received signal 805 includes a plurality of bins corresponding to columns labeled A through P, as depicted along the x-axis. The received signal 805 includes a finite number of bins. Each bin represents a different frequency range. In this respect, each bin may be an individual contiguous range making up a part of a signal band. The received signal 805 shown in FIG. 8A may be chirp signal ranging from frequencies B to O, where O minus B is the bandwidth.

Along the y-axis are the coefficients of each bin. The coefficients may refer to an amplitude, energy, or other value that correlates to amplitude or energy of a signal at a particular bin. The received signal 805 has coefficients ranging in values from 4 to 6. This may be considered a relatively flat signal in the frequency domain. If represented in the time domain, the received signal 805 may include a frequency spread that increases or decreases in frequency at a linear rate. The received signal 805 may not be perfectly flat. For example, information may be encoded in the received signal 805 or some degree of noise may be present in the received signal 805. However, no interference component is present in the received signal 805.

Figure 8B:
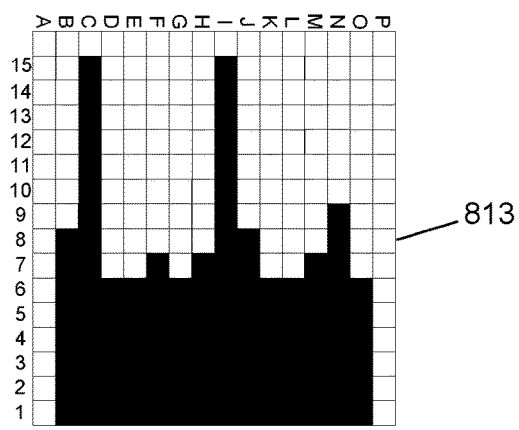

FIG. 8B is a drawing of an example of a received signal 813 that is subject to narrowband interference, as expressed in the frequency domain, according to various aspects of the present disclosure. Unlike the received signal 805 of FIG. 8A, the received signal 813 of FIG. 8B experiences some narrowband interference. The received signal 813 may be the received signal 129 of FIG. 1B. The received signal 813 may be received by an RF front end of a receiver such as, for example, the receiver 620 of FIG. 6B. Thereafter, the received signal 813 may be converted into frequency-domain data using a Fourier transform unit such as, for example, the Fourier transform unit 705 of FIG. 7.

Like the received signal 805 of FIG. 8A, the received signal 813 of FIG. 8B is in the same band, ranging from frequency bin B to frequency bin O. However, some bins have significantly larger coefficients than other bins. For example, bin C and bin I have coefficient values of 15. The next largest is bin N having a value of 9. A majority of bins have values between 6 and 8. It is likely, then, that the received signal 813 was subject to interference from an interference source that emitted electromagnetic radiation in frequencies corresponding to bin C and bin I. It may be impossible to ascertain what the received signal 813 should have been without interference. In other words, the receiver is unable to differentiate the correct energy level for bin C and bin I absent interference.

The received signal 813 represents an unprocessed or unfiltered signal. The time-domain version of the received signal may be stored in memory along with the frequency-domain version of the received signal. Bin C and bin I may be selected as candidate bins. For example, the energy levels for bin C and bin I may exceed a threshold energy level that is defined in relative or absolute terms. The threshold may be a percentage or standard deviation above the mean or median energy level. Candidate bins may be sequential or may be non-sequential bins. In this respect, interference signals that occupy separate, non-contiguous, frequency ranges may be detected. In addition, the number of candidate bins may exceed more than half of the number of bins.

An SINR value may be calculated for the received signal 813. For example, the signal power may be determined by summing all bin energy levels. The interference may be estimated by squaring the energy level for each candidate bin and dividing it by the number of bins squared. This process may be performed for each candidate bin to estimate the interference in the received signal 813.

Figure 8C:
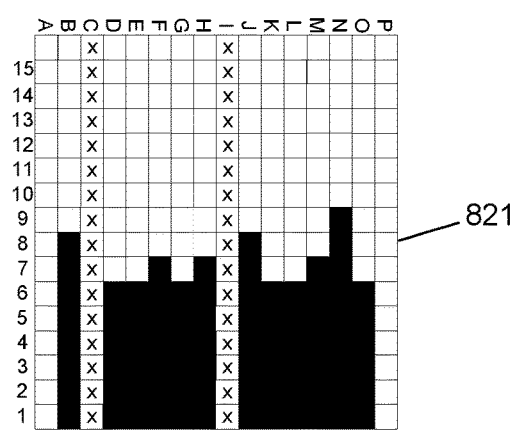

FIG. 8C is a drawing of an example of a filtered signal 821, as expressed in the frequency domain, according to various aspects of the present disclosure. The filtered signal 821 may be generated by using a filter, such as, for example, the filter 716, to remove the candidate bins from the received signal 813 of FIG. 8B. The removal of the candidate bins reduces the signal power, but also reduces the interference power. As shown in FIG. 8C, bin C and bin I are removed from the frequency-domain data, thereby producing the filtered signal 821. Because the filtered signal 821 is processed in the frequency domain, there may be a period of time where there is no time-domain version of the filtered signal 821 that is stored. A time-domain version of the filtered signal 821 may be generated by applying an inverse Fourier transform. However, this consumes processing resources as well as time.

An SINR value may be calculated for the filtered signal 821. For example, the signal power may be determined by summing all bin energy levels that have not been filtered out. This includes bins B, D-H, and J-O. There is no interference power in the filtered signal 821, given that the candidate bins are removed. The SINR values of the received signal 813 of FIG. 8B and the filtered signal 821 of FIG. 8C are compared to determine which signal has higher quality (greater SINR value). The signal with the higher quality is then demodulated.

Figure 9:
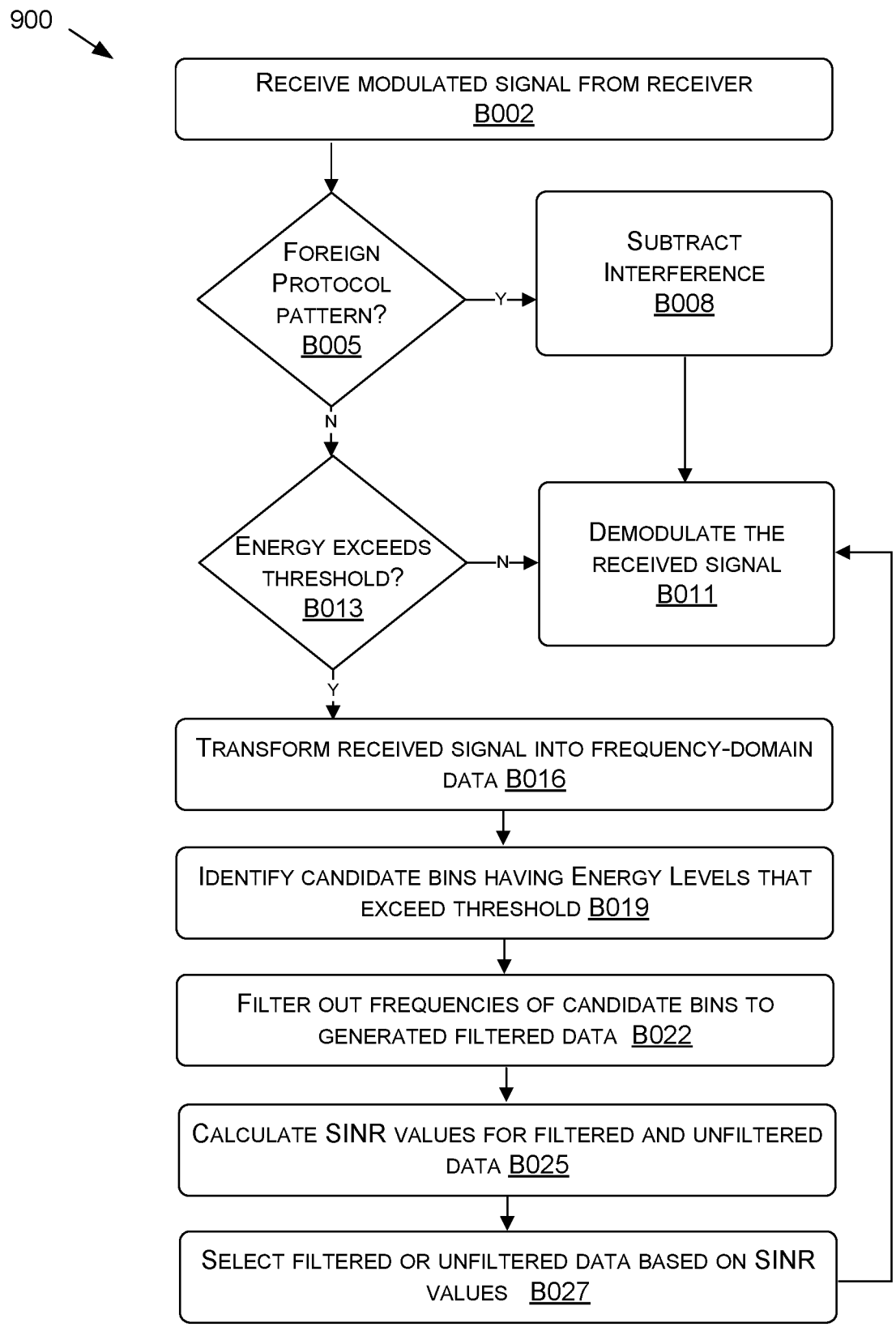
FIG. 9 is a flowchart illustrating an example process for performing selective interference cancellation according to various aspects of the present disclosure.

FIG. 9 is a flowchart illustrating an example process 900 for performing selective interference cancellation, according to various aspects of the present disclosure. The process 900, at block B002 receives a modulated signal from a receiver. The signal may be the received signal 129 of FIG. 1B, the received signal 813 of FIG. 8B, or any other electromagnetic signal that is transmitted for communicating information. The received signal may comprise digital samples of data that are encoded in the signal. The received signal may conform to a wireless transmission protocol so that it can be demodulated for extracting the information. The received signal may or may not be subject to interference, such as, for example, narrowband interference.

The process 900, at block B005 determines whether a pattern of a foreign transmission protocol is present in the received signal. For example, the received signal may be decoded to determine whether an additional signal is present in the received signal. An additional signal may exist as a result of an interference source transmitting a signal according to a foreign transmission protocol that is different than the transmission protocol expected by the demodulator. A protocol detector, such as, for example, the protocol detector 721 of FIG. 7, may identify the foreign transmission protocol of the additional signal.

If, at block B005, it is determined that a pattern of a foreign transmission protocol is present in the received signal, then at block B008 the process 900 subtracts the interference associated with the additional signal. For example, a protocol detector may identify an interference pattern associated with the transmission protocol. This pattern may be, for example, a preamble, header, symbol, handshake, or other predetermined signal pattern that may be present in signals that are formatted according to an identified transmission protocol. For example, if the receiver is a chirp spread spectrum-based receiver, and a Bluetooth signal is detected in a received signal, frequency components associated with Bluetooth signals may be subtracted from the received signal. The process 900 may reconstruct a Bluetooth signal according to the signal pattern and then subtract the reconstructed Bluetooth signal from the received signal. In this respect, an interference pattern associated with Bluetooth signals is removed from the received signal. Because the interference has been properly identified, no subsequent interference filtering may be needed.

At block B011, the process 900 demodulates the received signal. For example, the received signal, as formatted in the time domain, is inputted into a demodulator to extract the modulated information. The demodulation process operates according to the transmission protocol of the received signal.

If, at block B005, it is determined that no pattern of a foreign transmission protocol is present in the received signal, then at block B013 the process 900 determines the total energy level of the received signal and evaluates whether it exceeds a threshold level. In some embodiments, the operations described in block B005 may occur in parallel with other operations of other blocks in FIG. 9, such as, for example the operations described with respect to block B013. The threshold may be a noise floor in instances where the wireless transmission protocol permits the demodulation of signals below the noise floor. Total energy may be determined for data in the time domain or in the frequency domain. The total signal energy is used to check whether the presence of interference is likely. This is an example of a mechanism to selectively perform interference detection and filtering, which may be a resource-intensive operation. If the signal energy is below a threshold level, then it is inferred that there is no interference, or no substantial interference sufficient to justify additional interference analysis and filtering. If the total signal energy is sufficiently low, the received signal is then demodulated in block B011 as described above.

If the signal energy exceeds a threshold level, the process 900, at block B016, transforms the received signal into frequency-domain data. The Fourier transformation unit 705 as depicted in FIG. 7 may be used for this process. The received signal as represented in the time domain may remain stored in memory while the frequency-domain data for the received signal is generated. In some embodiments, frequency-domain data is generated before block B013.

At block B019, the process 900 identifies one or more candidate bins having energy levels that exceed a threshold.

For example, the process 900 selects bins in the frequency-domain data that have energy levels that are substantially larger than expected values or average values.

At block B022, the process 900 filters out frequencies of candidate bins to generate filtered data. The filtering process occurs in the frequency domain, and it has the effect of reducing the signal power by removing specific frequencies from the signal. The filtering process operates like a notch filter to cut away or block frequencies with large amplitudes.

At block B025, the process 900 calculates SINR values for the filtered and unfiltered data. For example, the process 900 checks whether the received signal, as expressed in the frequency domain, has better quality with or without the frequencies of the candidate bins removed.

At block B027, the process 900 selects either the filtered or unfiltered signal data based on the respective SINR values. The SINR values may be compared, and the signal data associated with the larger SINR value is considered to be higher quality. If the unfiltered signal data is selected, then the time-domain version of it as initially received is passed to a demodulator. If the filtered signal data is selected, then it is converted into time-domain data using an inverse Fourier transform process and then passed to the demodulator.

The processes 900 is illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits). For example, each block or processing segment may be implemented using a stand-alone special purpose device such as, for example, a digital signal processor, a processing-in-memory device, or a specialized processor.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

Some embodiments of the present disclosure are directed to an apparatus for selectively removing narrowband interference from a radio frequency (RF) signal. The apparatus may include a Fast Fourier Transform unit configured to transform a received signal into frequency-domain data. The frequency-domain data may comprise a plurality of bins of frequency ranges and a bin energy level corresponding to each bin. The apparatus may include an interference detector configured to identify a candidate bin having a bin energy level that exceeds a threshold bin energy level. The apparatus may include a notch filter configured to generate processed frequency-domain data by attenuating the energy level of the candidate bin in the frequency-domain data. The apparatus may further include a signal-to-interference-plus-noise ratio (SINR) calculator configured to generate a first SINR value based on the frequency-domain data and to generate a second SINR value based on the processed frequency-domain data. An output block of the apparatus may be configured to output the frequency-domain data in response to the first SINR value being greater than the second SINR value, and output the processed frequency-domain data in response to the second SINR value being greater than the first SINR value. In some embodiments, the apparatus may include an energy detector configured to determine a total signal energy of the received signal such that the interference detector is configured to selectively identify the candidate bin by comparing the total signal energy of the received signal to a threshold signal energy level.

Some embodiments involve a method that includes the steps of transforming a received signal into frequency-domain data and identifying a candidate bin in the frequency-domain data having a bin energy level that exceeds a threshold bin energy level. The method may generate processed frequency-domain data by attenuating the energy level of the candidate bin in the frequency-domain data and generate a first signal-to-interference-plus-noise ratio (SINR) value based on the frequency-domain data. The method may generate a second SINR value based on the processed frequency-domain data and determine that the second SINR value is greater than the first SINR value. The method may output the processed frequency-domain data to a demodulator to extract information encoded in the received signal. In some embodiments, the received signal corresponds to a chirp symbol, and the threshold signal energy level is a noise floor corresponding to a background noise level that is present before a signal is received by a receiver. In some embodiments, the method includes identifying the candidate bin in response to determining that a total energy level of the received signal exceeds a threshold signal energy level. The total energy level may be determined by performing an integration operation in time domain. The total energy level may alternatively be determined by summing a plurality of energy levels associated with corresponding bins in the frequency-domain data. A Fast Fourier Transformation unit may perform the transforming. In some embodiments, the candidate bin comprises a plurality of bins within the frequency-domain data. In some embodiments, a protocol detector is included. For example, the method may involve determining that the received signal includes an interference signal according to a transmission protocol. Then an interference pattern in the interference signal may be identified. The interference pattern may be associated with the transmission protocol. In addition, a reconstructed signal based on the interference pattern is generated, and the reconstructed signal is subtracted from the received signal. The method may involve decoding a preamble of the interference signal to determine the interference pattern.

Some embodiments involve a method that determines that an energy level of a frequency range within a chirp signal exceeds a threshold range level. The method may involve the step of attenuating the energy level of the frequency range from the chirp signal to produce a filtered chirp signal. The method may involve determining that a first signal-to-noise-plus-interference ratio (SINR) value of the filtered chirp signal is greater than a second SINR value of the chirp signal. In addition, the method may include demodulating the filtered chirp signal to extract information expressed in the chirp signal in response to the second SINR value being greater than the first SINR value. In some embodiments, determining that the energy level of a frequency range within a chirp signal exceeds a threshold range level is selectively performed based on a determination that a total energy level of a chirp signal exceeds a threshold signal energy level. In some embodiments, the chirp signal corresponds to a chirp symbol and the threshold signal energy level is a noise floor corresponding to a background noise level that is present before a signal is received by a receiver. In some embodiments, the total energy level is determined by performing an integration operation of the chirp signal as expressed in the time domain. In some embodiments, the method involves transforming the chirp signal into the frequency domain using a Fast Fourier Transform operation prior to generating the filtered chirp signal. In some embodiments, attenuating the energy level includes assigning an energy level of the frequency range a value of zero. In the method the frequency range may include a plurality of non-contiguous frequency ranges. The method may also include additional steps using a protocol detector. For example, the method may include determining that the chirp signal includes an interference signal according to a transmission protocol. The method may further include identifying an interference pattern in the chirp signal, where the interference pattern is associated with the transmission protocol. The method may include generating a reconstructed signal based on the interference pattern and then subtracting the reconstructed signal from the chirp signal. In some embodiments, determining that the chirp signal includes the interference signal according to the transmission protocol includes the step of decoding a preamble of the interference signal.

What is claimed is:

1. An apparatus for selectively removing narrowband interference from a radio frequency (RF) signal, the apparatus comprising:
   a Fast Fourier Transform unit configured to transform a received signal into frequency-domain data, the frequency-domain data comprising a plurality of bins of frequency ranges and a bin energy level corresponding to each bin;
   an interference detector configured to identify a candidate bin having a bin energy level that exceeds a threshold bin energy level;
   a notch filter configured to generate processed frequency-domain data by attenuating the energy level of the candidate bin in the frequency-domain data;
   a signal-to-interference-plus-noise ratio (SINR) calculator configured to generate a first SINR value based on the frequency-domain data and to generate a second SINR value based on the processed frequency-domain data; and
   an output block configured to output the frequency-domain data in response to the first SINR value being greater than the second SINR value, and output the processed frequency-domain data in response to the second SINR value being greater than the first SINR value.

2. The apparatus of claim 1, further comprising an energy detector configured to determine a total signal energy of the received signal, wherein the interference detector is configured to selectively identify the candidate bin by comparing the total signal energy of the received signal to a threshold signal energy level.

3. A method comprising:
   transforming a received signal into frequency-domain data;
   identifying a candidate bin in the frequency-domain data having a bin energy level that exceeds a threshold bin energy level;
   generating processed frequency-domain data by attenuating the energy level of the candidate bin in the frequency-domain data;
   generating a first signal-to-interference-plus-noise ratio (SINR) value based on the frequency-domain data;
   generating a second SINR value based on the processed frequency-domain data;
   determining that the second SINR value is greater than the first SINR value; and
   outputting the processed frequency-domain data to a demodulator to extract information encoded in the received signal.

4. The method of claim 3, wherein the received signal corresponds to a chirp symbol, and wherein the threshold signal energy level is a noise floor.

5. The method of claim 4, wherein identifying the candidate bin comprises identifying the candidate bin in response to determining that a total energy level of the received signal exceeds a threshold signal energy level.

6. The method of claim 5, wherein the total energy level is determined by performing an integration operation in a time domain.

7. The method of claim 5, wherein the total energy level is determined by summing a plurality of energy levels associated with corresponding bins in the frequency-domain data.

8. The method of claim 3, wherein the transforming the received signal into frequency-domain data is performed using a Fast Fourier Transformation unit.

9. The method of claim 3, wherein the candidate bin comprises a plurality of bins within the frequency-domain data.

10. The method of claim 3, further comprising:
    determining that the received signal includes an interference signal according to a transmission protocol;
    identifying an interference pattern in the interference signal, the interference pattern being associated with the transmission protocol;
    generating a reconstructed signal based on the interference pattern; and
    subtracting the reconstructed signal from the received signal.

11. The method of claim 10, wherein determining that the received signal includes the interference signal according to the transmission protocol comprises decoding a preamble of the interference signal.

12. A method comprising:
    determining that an energy level of a frequency range within a chirp signal exceeds a threshold range level;
    attenuating the energy level of the frequency range from the chirp signal to produce a filtered chirp signal;
    determining that a first signal-to-noise-plus-interference ratio (SINR) value of the filtered chirp signal is greater than a second SINR value of the chirp signal; and
    demodulating the filtered chirp signal to extract information expressed in the chirp signal in response to the second SINR value being greater than the first SINR value.

13. The method of claim 12, wherein determining that the energy level of a frequency range within a chirp signal exceeds a threshold range level is selectively performed based on a determination that a total energy level of a chirp signal exceeds a threshold signal energy level.

14. The method of claim 13, wherein the chirp signal corresponds to a chirp symbol and wherein the threshold signal energy level is a noise floor.

15. The method of claim 13, wherein the total energy level is determined by performing an integration operation of the chirp signal as expressed in a time domain.

16. The method of claim 12, further comprising transforming the chirp signal into a frequency domain using a Fast Fourier Transform operation prior to generating the filtered chirp signal.

17. The method of claim 12, wherein attenuating the energy level comprises assigning an energy level of the frequency range a value of zero.

18. The method of claim 12, wherein the frequency range comprises a plurality of non-contiguous frequency ranges.

19. The method of claim 12, further comprising:
    determining that the chirp signal includes an interference signal according to a transmission protocol;
    identifying an interference pattern in the chirp signal, the interference pattern associated with the transmission protocol;
    generating a reconstructed signal based on the interference pattern; and
    subtracting the reconstructed signal from the chirp signal.

20. The method of claim 19, wherein determining that the chirp signal includes the interference signal according to the transmission protocol comprises decoding a preamble of the interference signal.

\* \* \* \* \*